July 21, 1970   F. E. FUNK ETAL   3,520,989

PRESSURE CONTAINMENT ELECTRICAL PENETRATION ASSEMBLY

Filed July 25, 1967   2 Sheets-Sheet 1

INVENTORS.
FORREST E. FUNK
MICHAEL KUDLICK
ROBERT G. MATTHEWS
JOHN B. YOUNG JR.
BY
Samuel E Turner

United States Patent Office 3,520,989
Patented July 21, 1970

3,520,989
PRESSURE CONTAINMENT ELECTRICAL
PENETRATION ASSEMBLY
Forrest E. Funk and Michael Kudlick, San Jose, and
Robert G. Matthews and John B. Young, Jr., Los
Gatos, Calif., assignors to General Electric Company,
a corporation of New York
Filed July 25, 1967, Ser. No. 655,950
Int. Cl. H01b 17/26; H05k 5/00
U.S. Cl. 174—151                                6 Claims

ABSTRACT OF THE DISCLOSURE

This describes an assembly for passing electrical conductors through the wall of a pressure and vapor containment vessel, for example, as used to house a nuclear reactor. Penetration nozzles or tubes are placed through the walls of the vessel when the containment vessel is constructed. The assembly of the invention is insertable in such a nozzle and comprises a pair of spaced headers through which the electrical conductors are passed and to which they are vapor and pressure sealed. Flanges are welded between each of the headers and the penetration nozzle to complete the vapor and pressure sealed installation.

In a known type of nuclear reactor, the reactor core is contained in a reactor vessel constructed of steel. The reactor vessel is housed in a containment building or vessel usually formed of concrete and having walls of several feet in thickness. The containment vessel thus provides biological shielding and it is pressure sealed to prevent escape of vapors, liquids and other reactor materials in the event of rupture of the reactor vessel. For operation of the reactor, it is necessary to pass a variety of electrical conductors, including power lines, control signal lines and monitoring signal lines, through the wall of the containment vessel.

A variety of containment electrical penetration devices have been proposed and used. Some of their deficiencies may be generally characterized as relatively expensive and complicated; as using undesirable materials, such as rubber, for pressure sealing thus requiring undesirable maintenance during the life of the reactor plant; and as requiring an undue amount of costly on-site assembly and installation time.

An object of this invention is to provide an electrical penetration assembly which is of substantially standardized form and which may be constructed and substantially assembled in factory to thereby minimize on-site installation time.

Another object is to provide an electrical penetration which maintains sealing integrity throughout the plant lifetime with litte or no maintenance.

Another object is to provide an electrical penetration having two pressure barriers in series.

The electrical penetration assembly of the invention comprises a pair of spaced headers, formed of weldable material, of a size to fit within a penetration tube or nozzle placed through the wall of the containment vessel during its construction. The headers are selected from three standardized types—high voltage, low voltage and control signal, and shielded cable—depending upon the type of electrical conductor to be passed by the particular assembly.

The headers are spaced apart by a cover of selectable length depending upon the length of the penetration nozzle within which the assembly is to be fitted. The electrical conductors or wires are passed through appropriate apertures or holes in each header and they are sealed to each header by a potting compound such as an epoxy resin. In the case of high voltage, low voltage and control conductors, a joint or splice is formed in the conductor adjacent each header, this joint being covered with a potting compound which prevents leaks along the conductor beneath its insulating jacket and along the spaces between the strands of a stranded conductor. For a shielded cable a leak-proof connector is fitted in each header.

To install the assembly in the penetration nozzle, a respective flange is welded or otherwise fused between each header and the penetration nozzle to form a double pressure barrier. Since one of the header-flange joints may be made at the factory, only three on-site welds are required for field installation of the assembly in the penetration nozzle.

The invention is described in greater detail hereinafter with reference to the accompanying drawing wherein.

Figure 1:
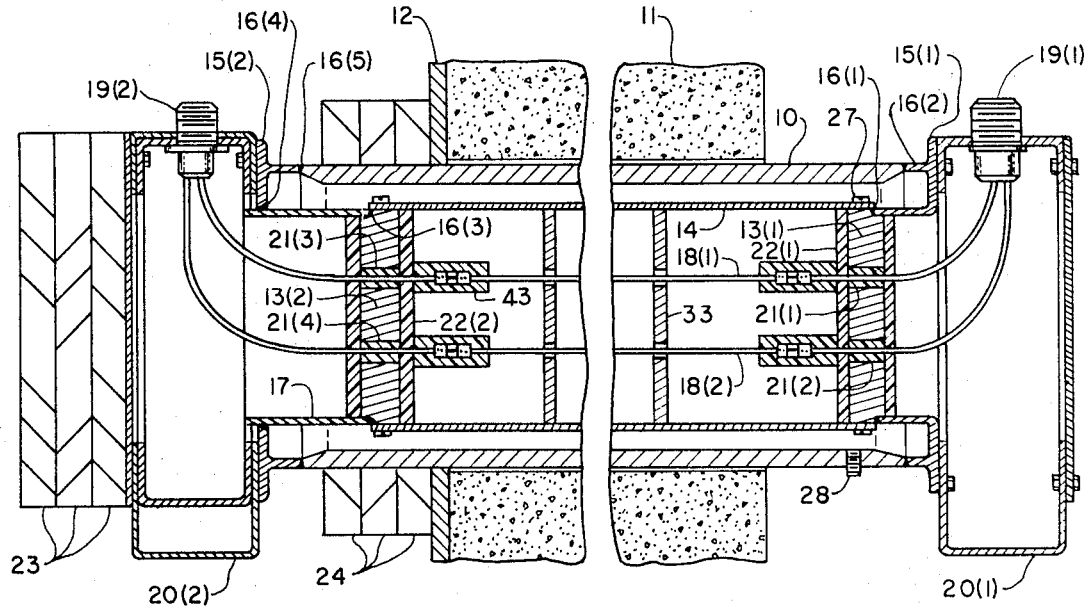
FIG. 1 is a cross section view of the general form of the penetration assembly of the invention as installed in a penetration nozzle in the wall of a containment vessel.

Shown in FIG. 1 is a penetration assembly of the invention as installed in a penetration nozzle 10 positioned through a concrete wall 11 of a containment vessel. A typical penetration nozzle is formed of a 12 inch diameter steel pipe. The length of the nozzle may vary, for example, from 3 to 12 feet depending upon the thickness of the containment wall. A member 12, on the inside of the containment, is welded to the nozzle 10. The member 12 may be a steel liner of the containment vessel or a suitable flange.

The penetration assembly comprises a pair of spaced headers 13(1) and 13(2) formed of fusable or weldable material such as steel. The headers 13(1) and 13(2) are held in spaced relation by a cylindrical cover 14 formed of sheet metal and attached to headers 13(1) and 13(2) by a plurality of screws 27. The cover 14 has a length approrpiate to the length of the penetration nozzle and it is conveniently split longitudinally to facilitate attachment after the wires have been installed through the headers.

The assembly is supported in the penetration nozzle by a flange 15(1) welded, by welds 16(1) and 16(2) between header 13(1) and the outside end of nozzle 10, and by a flange arrangement including a flange 15(2) and a flange extension 17 welded, by welds 16(3), 16(4) and 16(5) between header 13(2) and the inside end of nozzle 10.

It is contemplated that welds 16(1) and 16(3) will be made in the factory during manufacture of the assembly while the welds 16(2), 16(4) and 16(5) will be made in the field when the assembly is installed in the penetration nozzle, thus the flange extension 17, which may be from a few inches to a foot or so in length, serves two purposes: It provides a tolerance in the length of the assembly with respect to the penetration nozzle and it provides a long heat path from the field weld 16(4) to the header 13(2) to decrease the likelihood of heat damage to the electrical insulation when the weld 16(4) is made.

Electrical conductors to be passed through the penetration assembly are illustrated in FIG. 1 as a pair of insulated wires 18(1) and 18(2). These wires run from a connector 19(1) fitted in an external junction box 20(1) through apertures or clearance holes 21(1)–21(4) in headers 13(1) and 13(2) to a connector 19(2) fitted in an internal junction box 20(2). Wires 18(1) and 18(2) are vapor and pressure sealed to the headers 13(1) and 13(2) by a potting compound 22(1) and 22(2), such as an epoxy resin, which is applied to both sides of each header and through the apertures 21(1)–21(4). Thus the installed assembly provides a double pressure barrier, a first barrier being provided by the flange 15(1) and the sealed header 13(1) and a second barrier being provided by the flange 15(2), the flange extension 17 and the sealed header 13(2).

For some types of insulated wire there is a leakage path along the wire beneath the insulating jacket. Also, stranded wire provides leakage channels among the strands thereof. To seal such leakage paths the insulation is stripped from a section of the wire adjacent the headers 13(1) and 13(2) and these sections are covered with a potting compound, such as an epoxy resin, to provide a seal between the insulating jacket and the wire and among the strands of stranded wires. In some cases it is more convenient and effective to cut, strip and splice the wires with a well-known, crimped type of connector. Such spliced and sealed joints are illustrated in FIG. 1, for example, at 43.

Other features of the penetration assembly illustrated in FIG. 1 include the following: For a long assembly it is desirable to provide intermediate support of the wires. For this purpose a suitable number of spaced, apertured support plates, such as a plate 33, may be provided. These plates are preferably formed of an insulating material such as glass filled epoxy. It is often desirable to provide radiation shielding of the penetration. This may be accomplished by providing a plurality of lead plates 23 and a plurality of lead washers 24 arranged as illustrated it being noted that shield plates 23 may be removed or installed as required without disturbing the penetration assembly. A removable plug 28 is provided along the bottom of the penetration nozzle to drain possible vapor condensate and to provide means for pressure testing of the penetration seals, a typical test pressure being 125 p.s.i. The double pressure seal also allows evacuation of the assembly and the insertion of an inert gas if desired.

Figure 2:
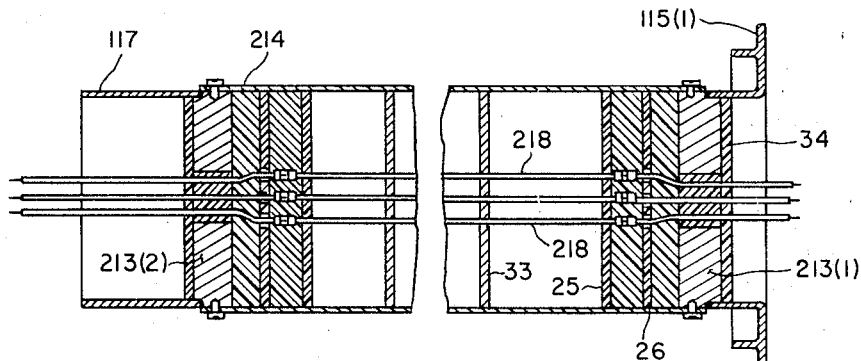
FIG. 2 is a cross section view of a header arrangement of an assembly adapted to pass low voltage and control signal conductors.

A header arrangement of a penetration assembly for low voltage and control conductors is shown in FIG. 2. A pair of headers 213(1) and 213(2) are held in spaced relation by a cover 214. The headers are formed with clearance holes to pass the desired number of conductors, such as a plurality of conductors or wires 218, the number being limited by the spacing required for electrical insulation, typically specified as $10^{10}$–$10^{12}$ ohms insulation resistance between conductors and between conductors and headers. A flange 115(1) is welded to header 213(1) and a flange extension 117 is welded to header 213(2).

For ease of manufacture and to provide a double seal of stranded wires and of the insulating jacket of the wire, two splices or joints are made in each wire, one near each of the headers. To facilitate potting or sealing, these joints are positioned between a pair of spaced, perforated, insulating plates, such as plates 25 and 26 adjacent header 213(1), which form a "splice potting fixture."

Figure 3:
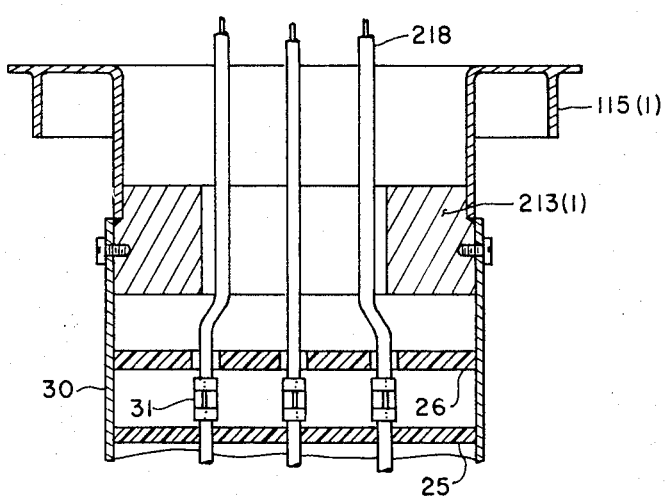
FIG. 3 is an enlarged cross section view of a header, a flange and a potting fixture illustrating the application of potting compound to the assembly of FIG. 2.

An arrangement for applying the potting compound to the splices and to the headers is illustrated in FIG. 3 wherein flange 115(1), header 213(1) and plates 25 and 26 are shown enlarged and rotated counterclockwise 90 degrees from their positions in FIG. 2. The epoxy resin recommended as a potting compound is a fluid of moderate viscosity before it has cured. The arrangement of FIG. 3 is designed to retain the fluid resin while it is curing or setting.

The plates 25 and 26 are retained in spaced relation to one another and to the header 115(1) by a removable band 30 which makes a "resin-tight" fit around the periphery of the plates and header. The apertures or holes in plate 25 are sized to provide a tight (resin-retaining) fit around the insulating jacket of wires 218 while the corresponding holes in plate 26 are sized to allow passage of the splices and flow of the resin around the wires, the wires preferably having been spliced by well-known crimped type of connectors 31.

The flange 115(1), band 30 and plate 25 thus form a resin-tight well into which the resin can be poured or injected to form the potting compound 34 shown in FIG. 2. The potting compound or resin can be applied to header 213(2) and the wire joints adjacent thereto in a similar manner at the same time. After the resin has set, the band 30 is removed and a cylindrical cover 214 (FIG. 2) then may be attached between the headers 213(1) and 213(2).

Figure 4:
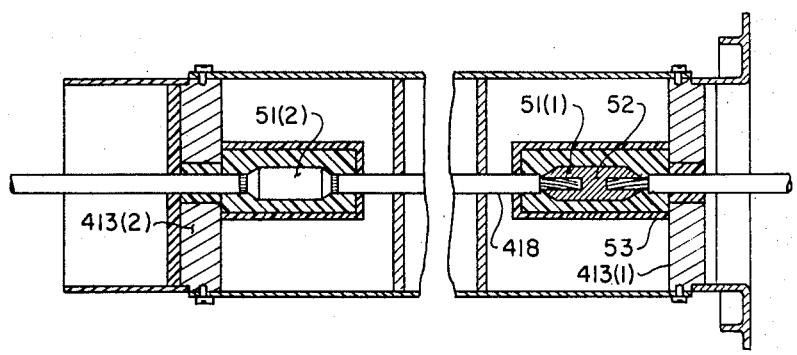
FIG. 4 is a cross section view of a header arrangement of an assembly adapted to pass high voltage conductors.

Illustrated in FIG. 4 is an electrical penetration assembly adapted to pass high-voltage, high-power cables, typically stranded cables of sizes No. 2 and larger, the cable ordinarily being sheathed in a heavy insulating jacket. A typical such cable 418 is shown in FIG. 4 passing through clearance holes in a pair of spaced headers 413(1) and 413(2). The cable is spliced near each header by, for example, a pair of crimpable connectors 51(1) and 51(2) having a solid center web, such as a web 52 of connector 51(1), which provides a leakage barrier. The splices are potted, for example, with an epoxy resin, to seal the splices and to seal the cable to the headers. To facilitate application of the potting compound, a cup, such as a cup 53 prefabricated from glass-filled epoxy resin, for example, is fitted over each splice. A hole in the bottom of the cup is sized to provide a resin-sealing fit over the insulating jacket of the cable while the open end of the cup abuts the header. The resin then may be poured to seal the splice and header at each end of the assembly in turn.

While only one cable is illustrated in FIG. 4, an assembly of standard 12 inch size will accommodate several high voltage cables depending upon the spacing required for electrical insulation.

Because of the heavy currents that such cables are adapted to carry there is a danger of excessive eddy current heating of the headers 413(1) and 413(2), which might deteriorate the electrical insulation. Therefore, it is preferable that these headers be fabricated from a material such as non-magnetic stainless steel to eliminate this possibility.

Figure 5:
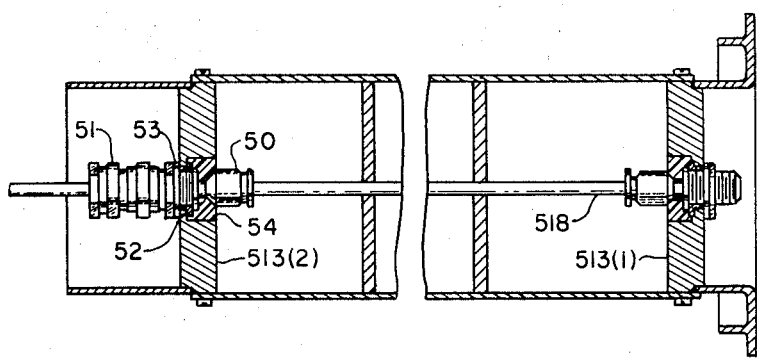
FIG. 5 is a cross section view of a header arrangement of an assembly adapted to pass shielded cables.

Illustrated in FIG. 5 is an electrical penetration assembly adapted to pass shielded signal cables such as a cable 518. A pair of spaced headers 5113(1) and 513(2) are formed with counterbored holes in which are fitted standard, sealed, bulkhead connectors such as a connector 50 which mates with a standard cable connector such as a connector 51. The connectors are preferably electrically insulated from the headers by an insulating sleeve 52 and washer 53. Each connector is sealed to the header by potting compound or resin, such as resin 54, which fills the counterbored part of each hole around each connector. While only one typical shielded cable 518 is illustrated in FIG. 5, a plurality of such cables can be accommodated in an assembly of standard 12 inch diameter.

Thus what has been described is an electrical penetration assembly which minimizes on-site installation time, which has long life and needs little maintenance and which provides a double pressure barrier.

While illustrative embodiments of the invention have been described herein other modifications and adaptations thereof may be made by those skilled in this particular art without departure from the spirit and scope of the invention as defined by the following claims:

What is claimed is:

1. An electrical penetration assembly for a containment vessel, comprising: an elongated hollow penetration member sealed in a wall of said vessel to provide a passage therethrough; a feedthrough assembly positioned in said passage including a pair of spaced headers each formed with at least one perforation; at least one electrical conductor extending form the outside of said vesel through a perforation of each of said headers to the inside of said vessel; a first flange member fused between one of said headers and said penetration member providing a vapor and pressure seal therebetween; a second flange member fused between the other of said headers and said penetration member providing a vapor and pressure seal therebetween; and means providing a vapor and pressure seal between said conductor and said headers.

2. The assembly of claim 1 wherein said electrical conductor is formed with an insulating covering and further including a section of said conductor between said headers from which said insulating covering is removed; and an insulating material applied to said section and providing a pressure and vapor seal between said conductor and said insulating covering thereof.

3. The assembly of claim 2 wherein said electrical conductor is formed of multiple strands and wherein said insulating material fills the spaces among said strands at said section.

4. The assembly of claim 1 wherein said electrical conductor is formed with an insulating covering and further including a section of said conductor adjacent each of said headers from which said insulating covering is removed; and an insulating material applied to each said section and providing a pressure and vapor seal between said conductor and said insulating covering at each said section.

5. The assembly of claim 1 including a plurality of electrical conductors each formed with an insulating covering, a stripped section of each of said conductors adjacent each of said headers from which said insulating covering is removed; a pair of insulating plates adjacent each header, said plates being perforated to pass said conductors, the plates of each pair being spaced and positioned so that said sections of said conductors are between the spaced plates for retaining said sections in spaced relation; and and a potting compound between each pair of plates providing a pressure and vapor seal between the stripped sections of said conductors and the insulating covering thereof.

6. The assembly of claim 1 wherein said electrical conductor is a coaxial cable including a cable connector sealed in each of said headers.

References Cited

UNITED STATES PATENTS

| | | | |
|---|---|---|---|
| 2,395,886 | 3/1946 | Lee | 174—22 X |
| 3,155,770 | 11/1964 | Hollenden et al. | 174—18 X |
| 3,342,929 | 9/1967 | Kleinfelder et al. | 174—21 X |

FOREIGN PATENTS

| | | |
|---|---|---|
| 1,340,207 | 9/1963 | France. |

OTHER REFERENCES

German printed application, No. 1,208,058, Dec. 30, 1965, Breu et al.

German printed application, No. 1,181,335, published Nov. 12, 1964, Dutton et al.

LARAMIE E. ASKIN, Primary Examiner

U.S. Cl. X.R.

174—18